July 1, 1930.    R. B. CLAGHORN    1,769,769
REVERSIBLE SULKY PLOW
Filed Jan. 22, 1929    4 Sheets-Sheet 4

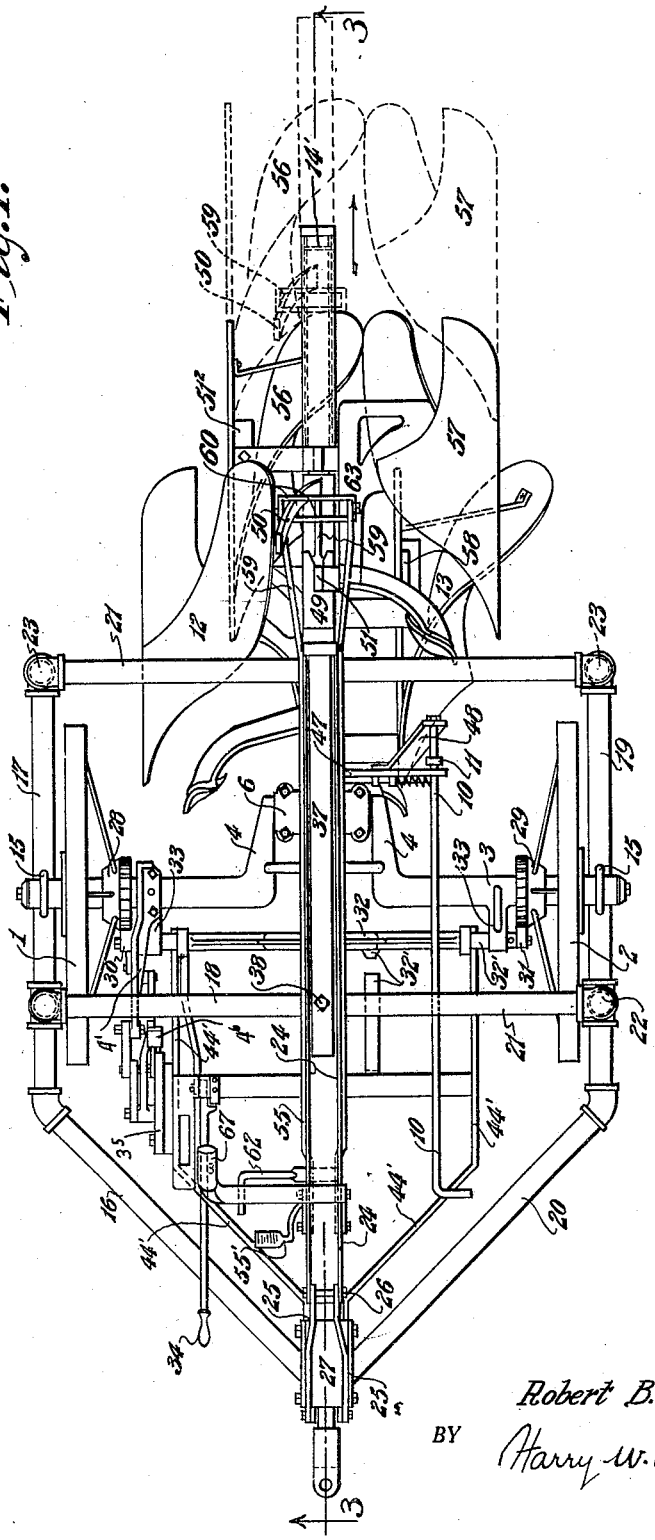

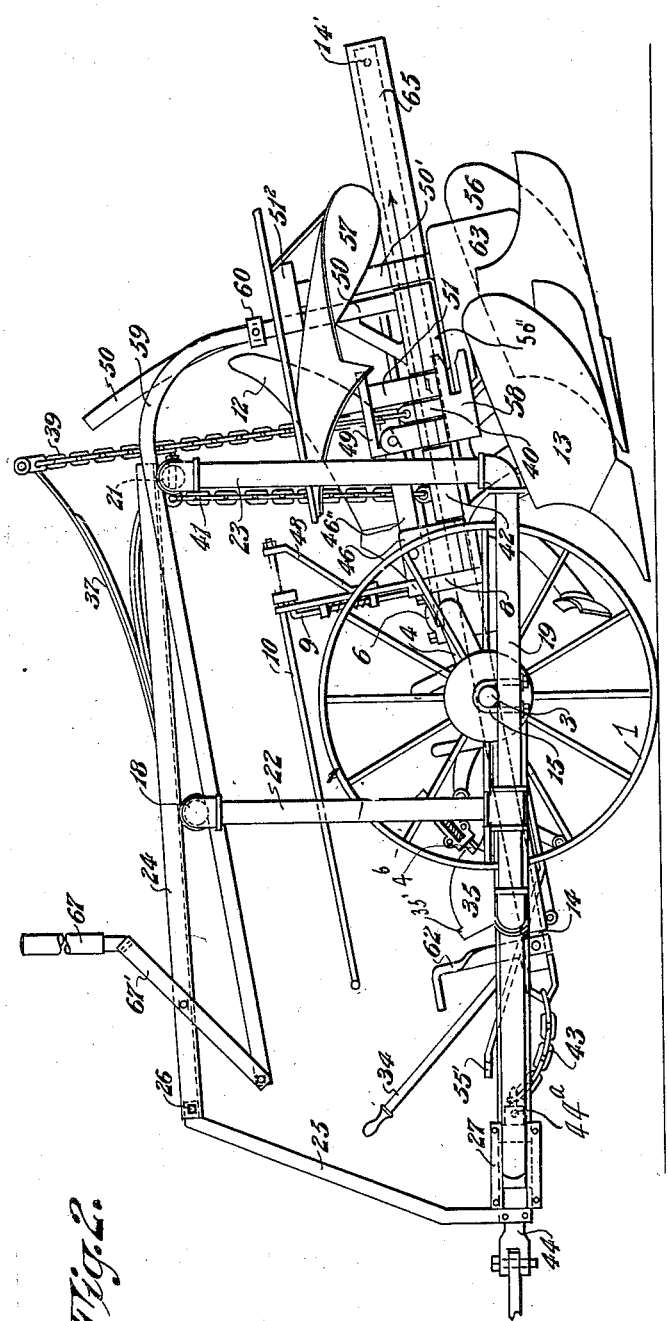

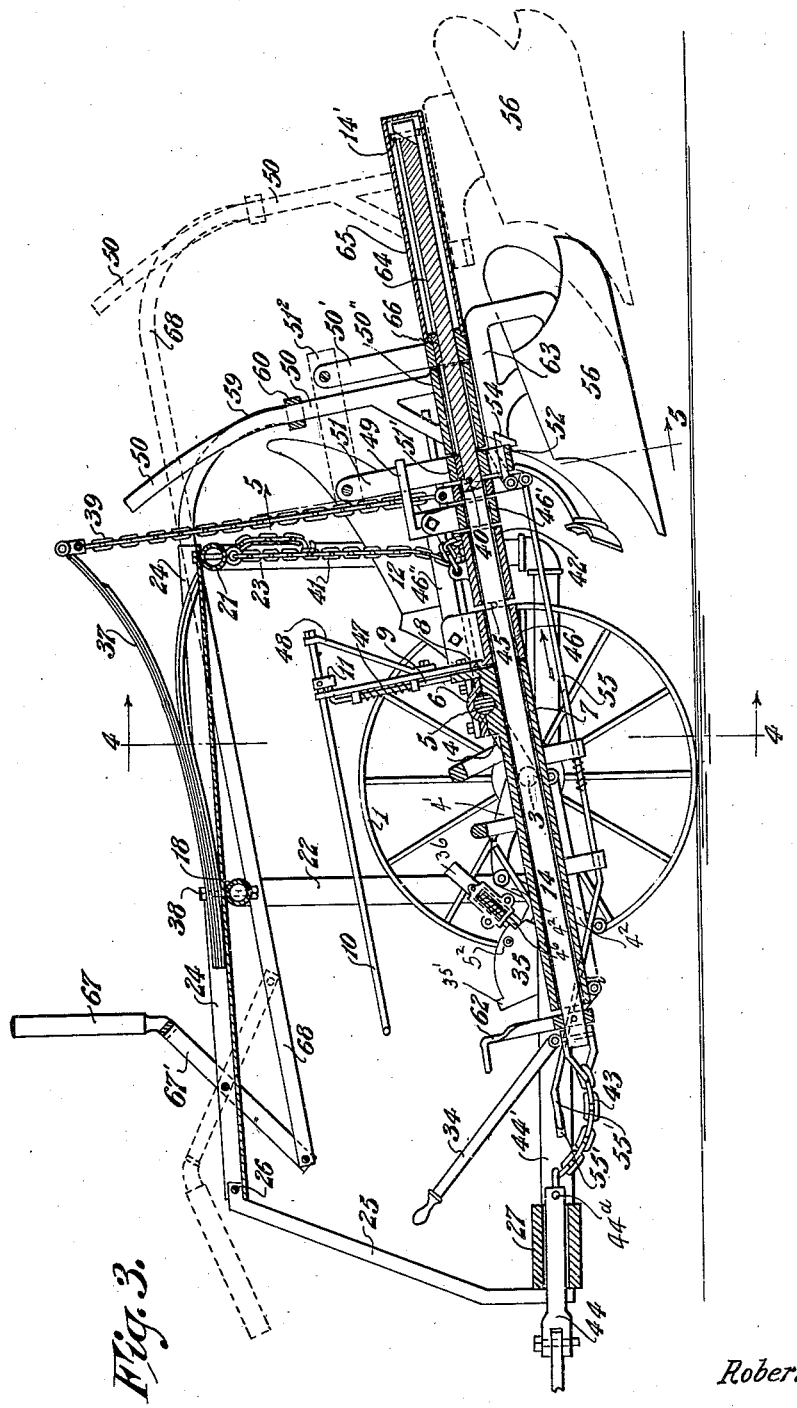

INVENTOR,
Robert B. Claghorn,
BY
Harry W. Bourn
ATTORNEY.

Patented July 1, 1930

1,769,769

UNITED STATES PATENT OFFICE

ROBERT B. CLAGHORN, OF GREENFIELD, MASSACHUSETTS

REVERSIBLE SULKY PLOW

Application filed January 22, 1929. Serial No. 334,290.

This invention relates to improvements in reversible sulky plows.

An object of the invention is to provide a sulky plow structure in which two sets of mold board plows are employed for cutting or turning two furrows at the same time. Heretofore, so far as I am aware, reversible sulky plows with only one mold board plow have been employed during the plowing operation.

Broadly, my invention comprises means for longitudinally reversing the positions of the two rear mold board plows with reference to each other, so that they may be brought into proper position for plowing on the return trip with reference to the position of a front mold board plow. There are four mold board plows in all, two of which are idle, while the other two are in use. At the end of the furrow, it is necessary to provide means for rotatably changing or reversing the position of the rear mold board plows; that is to say, move them rearward as a unit, and then rotate them with their supporting shaft in order to position one of them relative to a front mold board plow. In order to accomplish this result, means are provided for longitudinally moving the rear mold board plows on a rotatable shaft.

The general framework of the plow is essentially the same as a single sulky plow and which includes the supporting wheels, the main axle shaft, the frame and ratchet mechanism which is operated by the hand for effecting the lifting of these plows from the ground at the end of the furrow.

Suitable means is provided for revolving each set of mold board plows independently of each other and for retaining two of them in their adjusted or operative positions and two in their inoperative positions.

Means is further provided for accurately positioning one of the rear mold board plows with reference to the front operative mold board plow in order that the two cutting mold board plows may be in operative position.

Further details, as to the construction and operation will be brought out in the description and the appended claims.

Referring to the drawings:

Fig. 1 is a plan view of the complete machine showing in full lines the mold board plows in their operative positions, and, in the dotted lines, the rear mold board plows in their positions, when moved rearward.

Fig. 2 is a side elevational view showing the front and rear mold board plows in an elevated position at the end of a furrow.

Fig. 3 is a longitudinal sectional view through the axis of the supporting shaft for the plows and illustrating the reversing and revolving mechanism, as indicated by the line 3—3 of Fig. 1.

Fig. 6 is a detail view of the elevating mechanism.

Referring to the drawings in detail:—

Figure 5:
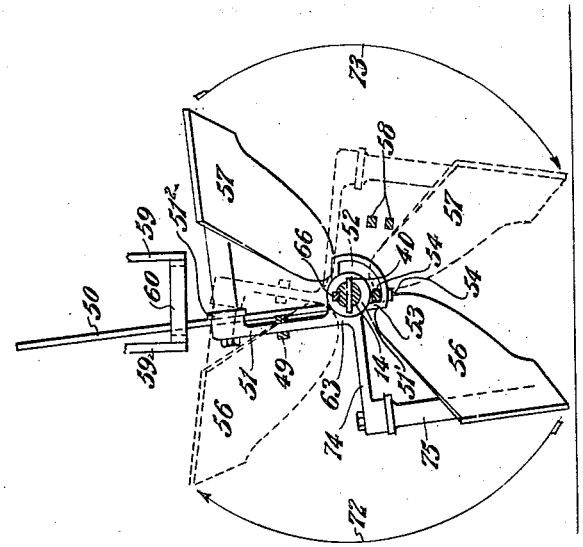
Fig. 5 is a transverse sectional view on the line 5—5 of Fig. 3 showing the rear mold board plows in operative and inoperative positions and the aligning device for the rear plows.

1 and 2 designate the usual supporting wheels which are mounted on the fixed axle 3, which is formed with the off set or arm portions 4, that are connected with the short bearing portion 5, that is located in the bearing box 6, and constitutes a part of the main tubular casting 7. This casting is formed with a rack 8 for receiving a latch rod 9, which is operable by means of the handle 10 through the crank arm 11. This handle serves the additional purpose for rotating the two front mold board plows 12 and 13, as will be described later in the statement of operation.

Located within the tubular casting 7 is a rotatable shaft 14. Supported on the axle shaft 3, by means of the U-shaped members 15, is a framework structure composed of the tubular or pipe members, 16, 17, 18, 19, 20, 21, 22 and 23. 24 is a channel iron member that is secured to the upper tubular members 18 and 21. The front end of the member 24 is secured to the brace bar 25 at 26, its lower end is secured to the fixed block 27.

Loosely mounted to turn on the axle 3 are the two rack gears 28 and 29, which revolve with the wheels 1 and 2. Cooperating with these gears are the pawls 30 and 31, which are secured to the shaft 32 that is mounted in the bearings 33. The usual foot lever 55' and handle 34 is connected to the shaft 32 for moving the pawls 30 and 31 into engagement with the rack gears 28 and 29, when the mechanism on casting 7 is to be elevated into the position shown in Figs. 3 and 6. 35 is the usual latch locking device which retains the mechanism on the casting 7, elevated. 36 is the trip for unlocking the locking mechanism, when the mold board plows are to be lowered and put into operation. The hand lever 34 is pivotally connected to the main frame bar 44' at 34'. $34^2$ is a link which is connected to and operates the pawls 30 and 31 for moving them into mesh with the ratchet gears 28 and 29. Connected to and movable with the shaft 4 is an arm 4', which is connected to the link $4^2$ that is connected to the bell crank lever arms $4^3$ and $4^4$, which is pivotally connected to the main frame at $4^5$. The arm $4^4$ carries the spring latch bolt $4^6$, which engages the quadrant 35. This bolt is automatically elevated by means of the lever 5', which is pivoted at one end to the fixed quadrant 35 at $5^2$, and to the link $5^3$ and arm $5^4$, which is operated by the lever 34. $34^3$ is a spring for retaining the lever 34 in its inoperative position.

For counterbalancing the weight of the mold board plows and the parts supported on the rear end of the shaft 14, a leaf spring 37 is secured at one end to the channel iron 24, with the bolt 38. 39 is a chain connecting the spring 37 and collar 40 on the shaft 14. A chain 41 connects the channel iron 24 with the collar 42, for adjustably regulating the depth of the cut of the furrows. 43 is a short loose chain which connects the front end of the shaft 14 and the slidable bolt 44, to which a tractor or other motive power is attached. 44' are two strap irons that connect the casting 32' and the block 27. There is a relative movement between the block 27 and the main framework, when tilted on the axle 3. This chain is necessary to permit the shaft 14 to be raised and lowered. 45 is a stop pin which extends transversely through the shaft 14. This pin engages the collar or sleeve part of the casting 46, which is a part of the frame that supports the front mold board plows 12 and 13. The casting 46 is connected to the collar 46', by means of the longitudinal bar 46'' (see Fig. 3). The two front mold board plows, 12 and 13, are connected to and supported by the members 46, 46' and 46'' by means of the arms 46''' (see Fig. 4), which forms a part of the casting 46 that turns loosely on the shaft 14. The casting 46 has attached thereto the bar 47 and brace 48. When the operator rotates or turns the rod 10, it withdraws the latch rod 9 from the fixed rack 8, as shown in Fig. 3. He can then rotate on the shaft 14 the frame composed of members 46, 46' and 46'' by means of the rod 10 after the latch 9 is withdrawn from the rack 8. This operation also turns the front mold board plows, 12 and 13 which are secured to this frame. 49 designates an upwardly and rearwardly extending fork member for receiving in the slot thereof the upwardly extending bar part 51 which is connected to the rear mold board plows and turns with them for retaining them in position, when they are in use. The part 51 is attached to the rear mold plow frame 63 by a collar 51'. It has an arc-shaped slot 52 in the depending part 53. (See Fig. 5.) In this slot is located the latch 54, which is for the purpose of retaining the rear mold board plows in place to prevent their being moved rearward, when in use. The latch 54 is operated by the rod 55, which extends forward to the foot pedal 55', within reach of the operator. When this pedal is depressed, the latch 54 is elevated permitting the rear mold board plows 56 and 57 to be moved rearwardly on the shaft 14 into the dotted line position, and then forwardly again after being laterally adjusted, as shown in Fig. 3.

58 designates a second fork-shaped member, (see Fig. 2), that is secured to the framework piece 46'' which revolubly supports the front mold board plows on the shaft 14. This second forked-shaped member is for the purpose of retaining the rear plows in their reversed plowing position, in the same manner as 49, on the first plowing trip.

Referring now to the structure for moving the rear mold board plows rearwardly on the shaft 14, and out of the way of the front mold board plows, in order to permit these front plows to be revolved into their new operative position, on the return trip, 59 are two rearwardly extending arms that are spaced from each other and secured together with the two cross bar pieces 60 as shown in Fig. 1. Located within this space is a curved rod 50, which is loosely mounted on the shaft 14 by means of the bearing box 50''. The rod 50 is engaged and turned by the bar part $51^2$, when the rear mold board plows are turned and is for the purpose of limiting the lateral rotary movement of the rear mold board plows, when they are rotated or turned with the shaft 14, by means of the arm 62, which is secured to the front end of the shaft 14, as shown. This operation aligns the part 51 of the rear mold board plow frame 63 with the slot in the parts 49 or 58.

The two rear mold board plows are slidably mounted on the shaft 14 by means of the frame members 50' and 51 to which the frame part 63 is secured that supports the two rear mold board plows 56 and 57 (see Figs. 1, 2 and 5).

The shaft 14 is formed with a longitudinal groove 64 and protective cover 65. The frame part 63 has a key 66 that slides in the groove against the limiting stop pin 14' (Fig. 3).

The operation may be described as follows:—

First, release the pull of the tractor. The operator now presses the lever 34 downward, which causes the pawls 30 and 31 to engage the ratchet wheels 28 and 29, which, when the machine is started elevates the mold board plows from the furrows at the end of the plot of ground being plowed. This operation continues until tripped by the parts 32' in the usual way. When the main frame is elevated, the spring latch 4⁶ through the bell crank arms 4³ and 4⁴ link 4² and arm 4¹ moves the latch 4⁶ into locking engagement with the rear shoulder of the quadrant 35. As soon as the pawls 30 and 31 are released by the trip 32', the lever 5' is operated from lever 34 to lift the latch 4⁶ and release the same from the quadrant, allowing the main frame to turn on the main shaft 3 and lower the plows for operation. The latch 4⁶ is now against the stop 35'. The operator now releases the latch 54 by pressing on pedal 55'. This operation unlocks the frame 63, which supports the two rear mold board plows 55 and 57. The handle 67 and link 67' are now moved into the dotted line position. This operation through the bars 59, spaced cross bar 60 and upwardly extending curved bar 50 which is secured to the frame 63 and located between the bars 60 causes the frame 63 and the rear mold boards secured thereto to move along on the shaft 14 with the key 66 in the groove 64 thereof, and the rear plows into the dotted line position, which position now permits the front mold board plows to clear the rear mold board plows and be free in order to be rotated on the shaft 14, into a position for plowing in the opposite direction. The front mold board plows are rotated or turned by means of the hand rod 10 which is secured to the frame 46. This rod, as stated, when axially rotated, withdraws the latch 9 from the fixed rack 8, then, by means of the rod 10 the frame parts 46, 46' and 46'', to which the front plows are secured, will be rotated or turned on the shaft 14 in the direction of the arrows 68 and 69; in other words, mold board plows 12 will take the place of plow 57 on the return trip. The latch 9 is now on the other side of the rack 8 (see Fig. 4). The companion throat piece 49 now assumes a new position for retaining the rear mold board plows in place. Next, the operator with the handle 62 revolves the shaft 14, which turns the two rear mold board plows and brings one of them into position relative to a front mold board plow for plowing on the return. The upwardly extending rod or bar 50 is rotated or turned on shaft 14 by the rear mold board plows, and, as this bar now is in the space 60 between rods 59 (see Figs. 4 and 5), it serves to accurately align the upwardly extending member 51 with the opening in the throat pieces 49 and 58, 46 which are secured to the frame which supports the two front mold board plows 12 and 13. The operator now slides the rear mold board plows forward by means of the handle 67, which brings the member 51 into the throat opening in either of the pieces 49 or 58. The latch 54 now snaps into locking position in the arc-shaped opening 52. The next operation is to drop the plows by releasing the latch 4⁶ from the rear shoulder on catch plate 35 by operating lever 34 as described. The machine is now ready for the return trip across the field.

Figure 4:
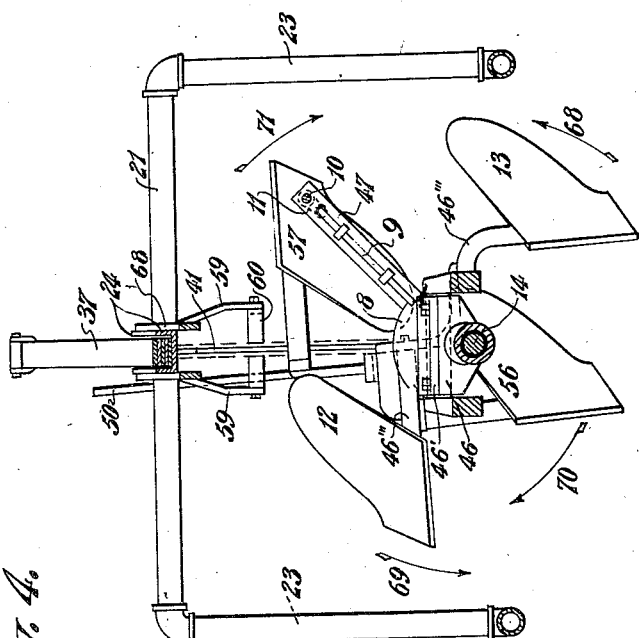
Fig. 4 is a transverse sectional view on the line 4—4 of Fig. 3, showing in detail the means for revolubly supporting the mold board plows, and the means for limiting the revolved positions of the rear plows.

It should be observed that the direction of rotation of the rear mold board plow is opposite to that of the front mold board plows, as shown by the arrows 68, 69 and 70, 71 in Fig. 4. The rear mold board plows, 56 and 57, are moved through an arc indicated by the lines 72 and 73. The front plows simply turn on the shaft 14, but the rear ones turn with and slide on this shaft.

At the end of the furrow in each direction, the rear mold board plows must be reversed and reciprocated longitudinally on the shaft 14, and rotated therewith in order to bring the proper rear mold board plow into relative lateral position, with reference to a front mold board plow, in order to position a front and a rear plow so that two furrows can be cut at the same time. A front mold board plow must always cut the outside furrow and a rear mold board plow the inner or second furrow. In order to fully explain the necessity of rotating the two rear mold board plows, 56 and 57 in a direction opposite to that in which the front mold board plows, 12 and 13, are rotated at the end of a furrow, the following is given. These two rear mold board plows are secured to the arms on the rear mold board plow frame 63 in an angular relation to each other of substantially 180°, as shown in Figs. 4 and 5. The front mold board plows are secured to two arms 46''' of the frame 46 at substantially 180° apart. Looking at Fig. 4, it is assumed that the front mold board plow 13 and the rear mold board plow 56 are in operation or have just finished a cut along one side of a field with the front plow 13 ahead or in advance of the rear plow 56. On the return cut the same longitudinal relation of the front and rear mold board plows must be maintained. In order to accomplish this relation, the front mold board plow 13 is rotated upward from the ground, as shown by the arrow 68 and the rear mold board plow 57 is rotated downward in an opposite direction, as shown by the arrow 71. Now, on the return trip or cut, the other front mold board plow 12 is rotated downward, as shown by the arrow 69, to bring it into operative relation, as shown by the arrow 69. The other rear mold board plow 57 is rotated downward, as shown by the arrow 71. This construction is made necessary as it would be impossible to rotate the front and rear mold board plows through practically 270° in the same direction. Moreover, the rod 50 which is secured to frame 63 and located in the space between the bars, 60 (See Figs. 1, 2, 3, 4 and 5,) necessarily limits the extent of rotation both right and left handed. Also, the bar 51 must always register with the slot between the arms 49, as shown in Fig. 1. Stating it another way, the position of the front and rear mold board plows are interchangeable: 57 will occupy the position of 13 and 56 will occupy the position of 12, as a comparison of Figs. 4 and 5 will show.

It should be stated that chain 43 is in a slack condition, as shown in Fig. 3, when the shaft 14 is raised, as the stop pin 44$^A$ is then against the casting 27. The draft is now on the main frame. When the mold board plows are dropped for their operating position, the chain 43 is taut and the bolt 44 is then moved rearward, thus drawing the stop pin 44$^A$ away from the casting 27. The draft is now transmitted or comes on the chain.

What I claim is:

1. A reversible sulky plow having, in combination with a main supporting frame, two front and two rear mold board plows, independent means for rotatably supporting the said mold board plows on said frame, a single shaft on which the said plows are mounted, and means for axially aligning the rear mold board plows on the shaft with reference to the front mold board plows.

2. A sulky plow having, in combination, a wheel supported frame, a rotatable shaft, two sets of mold board plows on the shaft, one set being rotatably supported on said shaft, means for independently rotating each set of mold board plows, and means for axially aligning the front and rear mold board plows of each set for operation.

3. A sulky plow, comprising in combination with a main frame thereof, a rotatable shaft secured in the main frame, front and rear mold board plows, one set being rotatably mounted on said shaft, means for rotating and positioning the front mold board plows on the shaft, slotted or fork members movable with the front mold board plows, means movable with the rear mold board plows for entering the slotted members for retaining them in lateral position relative to each other, and means for effecting the alignment of the rear mold board plows prior to the entrance of the said means into the slotted members, and latch means for retaining the said latter means in the slotted members.

4. A reversible sulky plow, comprising in combination with a main frame thereof, a rotatable shaft secured to the main frame, two front and two rear mold board plows, one set being rotatably mounted on said shaft, means for rotating and positioning the two front mold board plows on the shaft, slotted fork members movable with the front mold board plows, means movable with the rear mold board plows for entering the slotted members for retaining them in lateral position, relative to each other, means for effecting the alignment of the rear mold board plows prior to the entrance of the said means into the slotted members, means for slidably mounting the rear mold board plows on the rotatable shaft, and latch means for retaining the said latter means in the slotted fork members.

5. A reversible sulky plow, comprising a wheeled supported frame, a shaft rotatably mounted in the frame, front and rear mold board plows mounted on the said shaft, means for latching and for rotating the front mold board plows in operative position, the rear mold board plows being rotated when the shaft is rotated, means carried by the rear mold board plows for limiting the extent of rotation of the said shaft, forked means for retaining the rear mold board plows in their operative position, and a latch device for retaining the forked means in operative position.

6. A reversible sulky plow, comprising a wheeled supported frame, a shaft rotatably mounted in the frame, front and rear mold board plows mounted on the said shaft, means for latching and for rotating the front mold board plows, the rear mold board plows being rotatable when the shaft is rotated, means carried by the rear mold board plows for limiting the extent of rotation of the said shaft, forked means carried by the front mold board plows for retaining the rear mold board plows in their operative position, a key and groove construction on the said shaft for slidably mounting the rear mold boards on the shaft, means for sliding the rear mold boards on the shaft, and a latch device for retaining the forked means in operative position.

7. A sulky plow construction, comprising in combination with a wheeled frame, a rotatable shaft having a groove therein, front and rear mold board plows mounted on the shaft, the front mold board plows being rotatably mounted on the shaft, the rear mold board plows being slidably mounted on the grooved shaft, means for sliding the rear mold board plows on the shaft comprising an upwardly extending rod connected to the rear mold board plows, two rods spaced from each other, rods connecting the spaced bars, the upwardly extending rod being located in the space, means for moving the spaced bars for causing the said rod to engage the spaced bars for effecting the backward and forward movement of the rear mold board plows on the shaft relative to the front mold board plows so that the front mold board plows may be rotated on the shaft, the upwardly extending rod and spaced bars operating to axially position the rear mold board plows relative to the front mold board plows, and means for retaining the said plows in their operative and lateral plowing positions.

8. A sulky plow construction comprising in combination with a wheeled frame, a grooved rotatable shaft, front and rear mold board plows mounted on the shaft, the front mold board plows being rotatably mounted on the shaft, the rear mold board plows being slidably mounted on the shaft, means for sliding the rear mold board plows on the shaft comprising an upwardly extending rod connected to the rear mold board plows, two rods spaced from each other, a rod connecting the spaced bars, the upwardly extending rod being located in the space, means for moving the spaced bars for causing the said rod to engage the bars for effecting the backward and forward movement of the rear mold board plows relative to the front mold board plows so that the front mold board plows may be rotated on the shaft, the upwardly extending rod and spaced bars operating to axially position the rear mold board plows relative to the front mold boards, and means for retaining the said plows in their operative and lateral plowing positions, and a latch device operable in an arc-shaped slot for retaining the said plows in fixed positions longitudinally of the said shaft.

9. In combination with a wheeled supported frame, an axially arranged and rotatable shaft, two pairs of mold board plows supported on the shaft, independent means for rotating the pairs of mold board plows, means for slidably supporting one pair of mold board plows on the shaft, this pair turning with the shaft, a bearing frame for rotatably supporting the other pair on the shaft, a latch mechanism connected to the bearing frame for rotating and positioning the said other pair of mold board plows, and means for retaining the slidably supported pair of mold board plows in fixed relation to the other pair.

10. In combination, in sulky plow, a tiltable frame, a single longitudinal shaft located in the frame, means for elevating the frame and locking the same in an elevated position, two front and two rear mold board plows on the said shaft, means for sliding the rear mold board plows on the shaft, when the frame is elevated, means for turning the rear mold board plows with the said shaft, separate means for turning the front mold board plows on the shaft and means for laterally aligning the said mold board plows.

11. In combination in a reversible sulky plow in which two pairs of mold board plows are mounted on a single shaft, each pair being arranged at an angle to each other, means for rotating the forward pair of mold board plows on the shaft, means for rotating the rearward pair of mold board plows with the shaft and interengaging means between the said pairs of mold board plows for laterally positioning a front and a rear mold board plow for cutting two furrows at once, the support of the rear pair on the shaft being slidable whereby the rear pair of mold board plows is movable on the shaft for permitting the front pair of plows to be rotated free or spaced from the rear pair of plows at the end of the furrow, as described.

12. In a reversible sulky plow, a shaft, two pairs of mold board plows mounted on the shaft, one front and one rear plow being positioned relative to the other pair, means for rotatably supporting one pair on the shaft, means for slidably mounting the other pair on the shaft, and means for laterally positioning one pair of mold board plows relative to the other, for cutting two furrows at once.

13. In a plow structure, a single rotatable shaft, a plurality of pairs of mold board plows mounted on the rotatable shaft comprising two pairs of said plows mounted on the said shaft, each pair being connected to a frame member, one of which is rotatable on the shaft and the other slidable, means for laterally spacing a mold board plow of one pair relative to a mold board plow of the other pair for cutting two furrows at once, whereby at the end of a furrow the other or unused front and rear mold board plows may be rotated relative to each other.

ROBERT B. CLAGHORN.